United States Patent
Hashimoto et al.

(10) Patent No.: US 12,554,552 B2
(45) Date of Patent: *Feb. 17, 2026

(54) COST ESTIMATION FOR A CLOUD-BASED INFRASTRUCTURE PROVISIONING SYSTEM

(71) Applicant: HashiCorp, San Francisco, CA (US)

(72) Inventors: Mitchell Hashimoto, Manhattan Beach, CA (US); Armon Dadgar, Seattle, WA (US); Matthew Hooker, San Francisco, CA (US); Paul Thrasher, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/444,399

(22) Filed: Feb. 16, 2024

(65) Prior Publication Data

US 2024/0193005 A1 Jun. 13, 2024

Related U.S. Application Data

(63) Continuation of application No. 17/828,804, filed on May 31, 2022, now Pat. No. 11,907,767, which is a continuation of application No. 16/843,672, filed on Apr. 8, 2020, now Pat. No. 11,347,559.

(51) Int. Cl.
| | |
|---|---|
| G06F 9/50 | (2006.01) |
| G06Q 30/0283 | (2023.01) |
| H04L 41/5041 | (2022.01) |
| H04L 67/51 | (2022.01) |

(52) U.S. Cl.
CPC .......... *G06F 9/5072* (2013.01); *G06F 9/5027* (2013.01); *G06Q 30/0283* (2013.01); *H04L 41/5045* (2013.01); *H04L 67/51* (2022.05)

(58) Field of Classification Search
CPC . G06F 9/5072; G06F 9/5027; G06Q 30/0283; H04L 41/5045; H04L 41/0813; H04L 41/0826; H04L 41/5048; H04L 41/5096; H04L 67/51
See application file for complete search history.

(56) References Cited

U.S. PATENT DOCUMENTS

| | | |
|---|---|---|
| 9,128,899 B1 | 9/2015 | McAlister |
| 11,347,559 B2 | 5/2022 | Hashimoto et al. |
| 11,907,767 B2 | 2/2024 | Hashimoto et al. |

(Continued)

*Primary Examiner* — Azizul Choudhury
(74) *Attorney, Agent, or Firm* — Cantor Colburn LLP; Rakesh Roy (57) ABSTRACT

A cost estimator system receives a plan, a configuration or proposed changes for a cloud-based infrastructure, and which include data representing one or more computing resources needed for a cloud-based application. A new configuration is generated for the cloud-based infrastructure incorporating the plan, configuration or proposed changes. A price resolver resolves a price of the resources that are part of the new configuration, and requests, from one or more cloud providers associated with the new configuration, price data for the resolved resources. The cost estimator system then generates, based on the price data received by the price resolver, a cost estimate for the new configuration of the cloud-based infrastructure.

12 Claims, 7 Drawing Sheets

(56) References Cited

U.S. PATENT DOCUMENTS

| | | | |
|---|---|---|---|
| 2011/0313902 A1* | 12/2011 | Liu | G06Q 30/04 |
| | | | 705/34 |
| 2014/0143427 A1 | 5/2014 | Hohenstein et al. | |
| 2014/0282536 A1* | 9/2014 | Dave | G06Q 30/0631 |
| | | | 718/1 |
| 2015/0271023 A1* | 9/2015 | Anderson | H04L 41/145 |
| | | | 709/223 |
| 2018/0324251 A1* | 11/2018 | Padmanabh | H04L 67/1097 |
| 2019/0258222 A1 | 8/2019 | Karandikar et al. | |
| 2021/0028991 A1* | 1/2021 | Nataraj | H04L 41/16 |

* cited by examiner

COST ESTIMATION FOR A CLOUD-BASED INFRASTRUCTURE PROVISIONING SYSTEM

CROSS-REFERENCES TO RELATED APPLICATIONS

The current application is a continuation of U.S. Non-Provisional patent application Ser. No. 16/843,672, filed on Apr. 8, 2020, entitled "COST ESTIMATION FOR A CLOUD-BASED INFRASTRUCTURE PROVISIONING SYSTEM", which is incorporated by reference herein in its entirety.

TECHNICAL FIELD

The subject matter described herein relates to a cloud-based infrastructure provisioning system, and more particularly to a system and method for estimating a cost associated with provisioning a cloud-based infrastructure.

BACKGROUND

Companies and organizations are rapidly transitioning their information technology (IT) resources to a cloud computing paradigm. This transition means shifting from largely dedicated servers in a private datacenter to a pool of computing capacity available on demand from one or more, and oftentimes many, cloud service providers. The foundation for adopting the cloud is infrastructure provisioning, which is the allocation of a cloud provider's resources and services to a customer based on the customer's needed and planned configurations. Several products exist to provision cloud infrastructure for any IT application, using an array of cloud providers for any target cloud platform.

To support shared services for infrastructure provisioning, information technology (IT) teams have started implementing reproducible infrastructure-as-code practices (i.e. managing and provisioning IT resources as machine-readable definition files and computer code), and then layering compliance and governance workflows to ensure appropriate controls on costs, user access, resource consumption, and the like. A goal of a shared service for infrastructure provisioning is to enable the delivery of reproducible infrastructure as code, providing development operations (DevOps) teams a way to plan and provision resources inside CI/CD workflows using familiar tools throughout.

DevOps teams can create infrastructure templates that express the configuration of services from one or more cloud platforms, which in turn can be integrated with all major configuration management tools to allow fine grained provisioning, such as for tiered storage or "elastic" or auto-scaling virtual machines, to be handled following the provisioning of the underlying cloud computing resources such as servers and databases. Finally, templates can be extended with configuration instructions for other services from many other independent software vendors (ISVs) and providers to include monitoring agents, application performance monitoring (APM) systems, security tooling, DNS, content delivery networks (CDN), and more. Once defined, the templates can be deployed as required in an automated way. In doing so, the configuration and a deployment plan become a common workflow for teams provisioning resources across public and private clouds.

The use of templates has enabled the growth of a self-service model for cloud provisioning, in which developers are able to do their own provisioning of the infrastructure resources for their cloud-based applications. Such self-service provisioning reduces the reliance on a separate IT group, and decoupling the template-creation process from the provisioning process greatly reduces the time taken for any application to go live because developers no longer need to wait for approval from their associated operations staff, as long as they use a pre-approved template. However, a trade-off is that the use of templates for self-service provisioning has made more difficult to monitor and control costs.

An important step in controlling costs of provisioning a cloud computing infrastructure is to provide visibility. A known approach used by some companies and organizations is to generate reports, such as spreadsheets, that break down the cost of the cloud computing resources used by each of the lines of business in the organization. Organizations depend on resource tagging and custom scripts or vendor products to attribute the costs to their teams and to generate the reports. As organizations move to the self-service model, they need to be able to shift accountability of controlling costs down to the teams and then down to the individual contributors.

It can be difficult to find a balance between (1) allowing teams the agility to provision the infrastructure they need, with (2) keeping costs aligned with the expected value of a project. The effort to keep costs aligned with value of any resource can lead to approval workflows that require oversight from an individual or team to determine if changes in cost are reasonable, which in turn can slow delivery and in itself increase the cost of implementation.

Organizations that are using an infrastructure as code approach to manage their multi-cloud provisioning, compliance, and management requirements can find it challenging to understand the cost implications of a change before it is applied. Instead, many organizations have used an after-the-fact approach to understand the cost impact of their changes, such as receiving alerts from their cloud provider, relying on dedicated third party services that continually monitor changes in cost, or waiting until they receive their end-of-period (i.e. monthly) bill.

One common challenge of cloud infrastructure adoption is enabling the practitioners who deploy the changes to understand the financial impact of the changes they are applying. Because such practitioners may no longer have direct access to the console of the cloud provider, they have no visibility into the billing-related details of the resources they are provisioning until long after those resources have been deployed. This can create a situation where those responsible for financial governance need to work with development operations ("DevOps") teams to retrospectively reduce the cost profile of infrastructure after it has been deployed, a task that is now more complicated and carries more risk than if there had been earlier intervention.

What is needed is a system and method for organizations to provide cost estimates for each infrastructure change request, instead of having to depend on after-the-fact aggregate cost estimate reports to understand the spending of provisioned resources.

SUMMARY

This document describes a cost estimation system and method for a cloud-based infrastructure provisioning system. The cost estimation system and method provides organizations insight into the cost implication of infrastructure changes before the changes are applied, and to instantaneously and accurately generate an estimate of costs for cloud computing workspaces and resources.

In one aspect, a system for estimating a cost for cloud-based infrastructure is disclosed. In some implementations, the system includes one or more processors and a non-transitory machine-readable medium storing instructions that are executable by the one or more processors to generate a set of functional computing modules. The computing modules can include a planning module configured to generate a plan, a configuration and/or proposed changes for a cloud-based infrastructure, wherein the plan, configuration or proposed changes includes data representing one or more computing resources needed for a cloud-based application. The computing modules can further include a cost estimator module configured to receive the plan, configuration and/or proposed changes for the cloud-based infrastructure to generate a cost of new configuration for the cloud-based infrastructure, the new configuration incorporating the plan, configuration and/or proposed changes.

The computing modules can further include one or more price resolvers in communication with the cost estimator module and being configured to analyze, determine or otherwise resolve resources that are part of the new configuration, and to request, from one or more cloud providers associated with the new configuration, price data for the resolved resources so as to enable the cost estimator module to generate a cost estimate for the new configuration of the cloud-based infrastructure.

The computing modules can further include a policy module that stores at least one cost policy for the cloud-based infrastructure, the policy module being configured to determine whether the cost estimate for the new configuration is in accordance with the at least one cost policy.

In another aspect, a method is disclosed. The method can include the steps of receiving, by a cost estimator system, a plan, a configuration and/or proposed changes for a cloud-based infrastructure, wherein the plan, configuration and/or proposed changes comprise data representing one or more computing resources needed for a cloud-based application. The method can further include the steps of generating, by the cost estimator system, a cost of a new configuration for the cloud-based infrastructure, the new configuration incorporating the plan, configuration or proposed changes, and resolving, by a price resolver of the cost estimator system, resources that are part of the new configuration. The method can further include the steps of requesting, by the price resolver from one or more cloud providers associated with the new configuration, price data for the resolved resources, and generating, by the cost estimator system based on the price data received by the price resolver, a cost estimate for the new configuration of the cloud-based infrastructure Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to cost estimation framework for cloud infrastructure provisioning, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Implementations of the subject matter described herein provide a cost estimation system and method for a cloud-based infrastructure provisioning system. The cost estimation system and method instantaneously and accurately generate an estimate of costs for cloud computing workspaces and associated computing resources to provide insight to users into the cost implication of infrastructure changes before the changes are applied to an organization's cloud computing infrastructure.

Consistent with implementations described herein, the following terms can be defined. A "plan estimate" is the estimated amount of money an organization will be charged over a given time period instituting a particular planned cloud configuration. A "resource" is a product made available by a cloud provider, which incurs cost for its use. A "price" (also called "unit price") is a value per unit in a given currency for a resource. Prices, or unit prices, are provided directly from the cloud providers, and represent what an organization will pay per unit of the resource. A "resource cost" (also referred to as "cost") is what an organization can expect the cost of a resource to be per a given unit. A "unit" is the smallest atomic usage of a resource, such as hours, or gigabyte-months, or the like. A "price resolver" is a module that provides pricing information for a cloud provider. "Static unit prices" refers to unit prices that can be determined at the time of provisioning. "Dynamic unit prices" refers to unit prices that cannot be determined at the time of provisioning.

An estimate can be generated after a configuration has been planned, but before it has been applied. An estimate can be generated from any user-provided configuration, and can be provided via an application programming interface (API), a command line interface (CLI), a user interface (UI), or the like. For instance, estimates can appear in a plan phase details window of a graphical UI (GUI) page in a browser application on a client computing system. Cost estimation is achieved by mapping the resources in a cloud infrastructure configuration onto prices provided by the providers of cloud resources. This mapping is provided by one or more price resolver modules. The costs can be calculated for a timespan, and before deployment of the resources. This would allow for arbitrary time intervals, rather than a fixed hour/day/month/year timespan, for a more accurate cost estimation.

Figure 1:
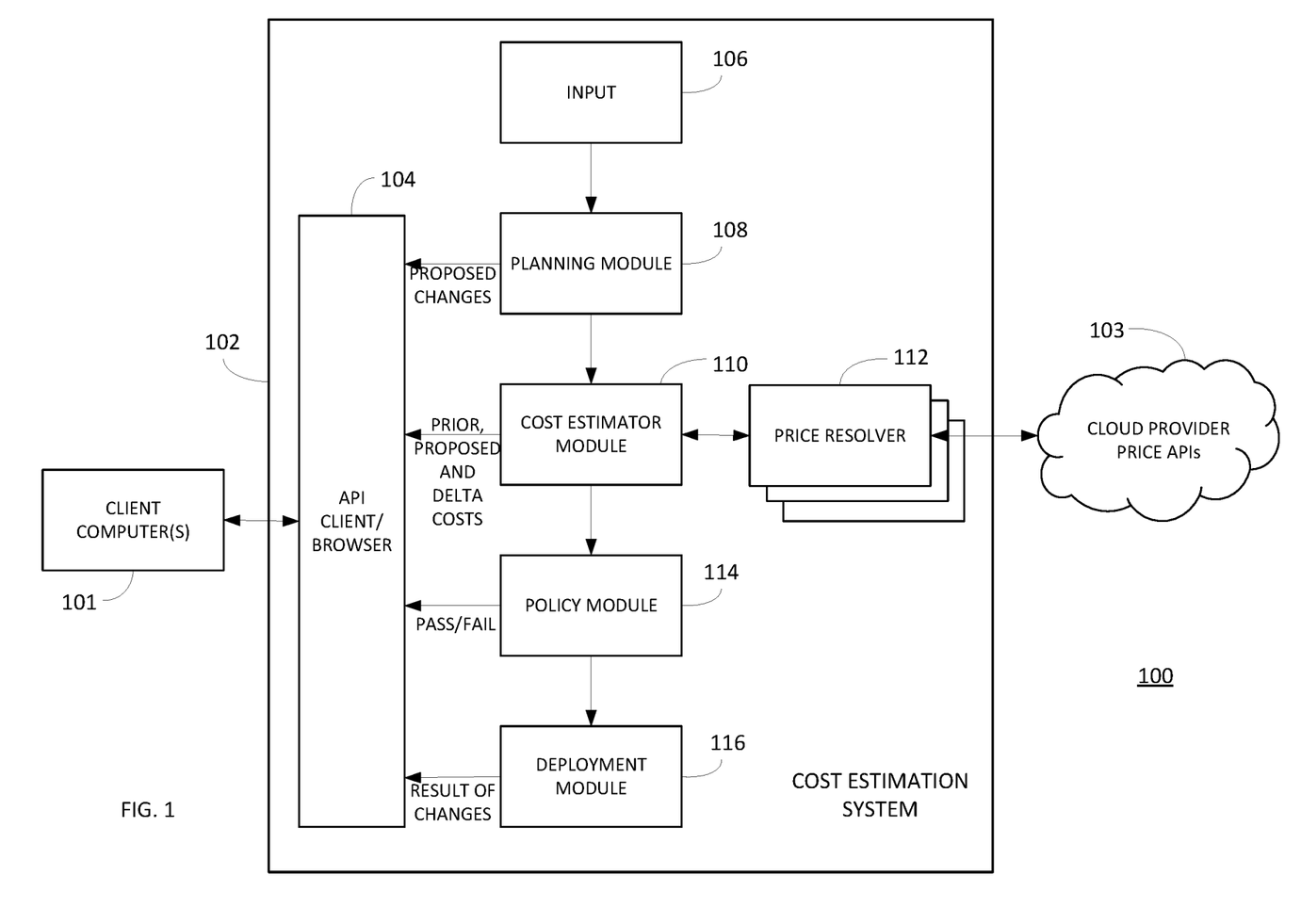
FIG. 1 illustrates a cost estimator system of a cost estimator framework for a cloud-based infrastructure provisioning system.

FIG. 1 shows a cost estimator framework 100 for providing a cost estimate to one or more client computers 101 based on resources planned or configured for being provisioned from one or more cloud providers 103. The cost estimator framework 100 includes a cost estimator system 102, which includes a number of processing modules to receive data representing a set of resources, such as a configuration file, for some or all of a cloud-based infrastructure. For instance, the resources can represent a change or upgrade to a cloud-based computing function or application, or can represent a change in a number of instances employed by an organization's cloud-based infrastructure. The output of the cost estimator system 102 is a pricing report.

The cost estimator system 102 includes a client API 104 that communicates data from the processing modules to the client computer(s) 101. The processing modules include an input module 106 that is configured to receive inputs such as cloud-based infrastructure configurations or changes, workspace variables, a current state of an already-provisioned cloud infrastructure, etc. These inputs are provided by the input module 106 to a planning module 108, which can also receive configurations and proposed changes from one or more developers that provide a technical specification for the one or more cloud-based applications. The planning module 108 assembles the inputs to generate a cloud infrastructure plan for a run-phase that will accommodate the technical specification and proposed changes to the cloud-based infrastructure configuration. The technical specification and proposed changes can be sent to the client computer(s) 101 via the API 104.

The cost estimator system 102 further includes a cost estimator module 110, which receives price information from a set of price resolvers 112 that resolve a price for each resource specified by the planning module, and which price is provided by the cloud providers or other resource providers 103 via provider APIs. The price resolvers 112 receive a current state of the organization's cloud-based infrastructure and proposed changes from the cost estimator module 110. In turn, the price resolvers 112 request price data from the one or more cloud providers 103 associated with each resource indicated by the proposed changes. The one or more cloud providers 103 return the price data to the price resolver 112, which is described in further detail below. The price resolvers 112 can be configured to also consult or query user input to price on-premise resources or to override cloud pricing in the case of custom negotiated contracts. Accordingly, the price resolvers 112 can consult user-provided pricing data, which allows the price resolvers 112 to incorporate a custom price for cloud resources, or to provide a baseline price for a resource that is otherwise unsupported (e.g. on-premise resources, as described above).

A price interface of a provider API is an interface describing the price of a resource, as shown in the table below, which is provided as an example only, and not to be limiting to any particular interface:

| | |
|---|---|
| UnitPric( ) Decimal | The decimal representation of the price or cost per unit. |
| Unit( ) string | The unit that the price describes, i.e. hour. |
| Description( ) string | The cloud provider-supplied description of this resource. |
| ProviderDescription( ) string | The description from the pricing catalog from the cloud provider. |
| SKU( ) string | The stock-keeping unit (SKU) used by the cloud provider. |
| Price(time.Duration) Decimal | The price estimate for the given time duration. The duration must be in multiples of an hour. |

A process for cost estimation includes a step to split, divide or allocate resources in the prior state and proposed changes among two or more cloud providers 103. Those split resources are sent to the price resolvers 112, which in turn request price data from the cloud APIs 103 to the cloud providers. The price resolvers search price data, and estimate costs of each requested resource based on the configuration or plan. The price resolvers 112 can format results according to prior, proposed and delta costs. The costs are then returned to the cost estimator module 110, which sends the prior, proposed and/or delta costs to the client computer(s) 101.

Accordingly, in some implementations, the price resolvers 112 provide a mechanism for translating cloud resources to prices, by mapping the resources to prices. In some cases, the resources are defined as a group of a number of instances, such as a cloud service autoscaling group (ASG) or the like, and determining the price for the group includes finding a base price for the instance, and multiply that base price by the cardinality of the group. In some other cases, the configuration file does not provide details about the number of instances, and so the system will determine an instance price for the launched configuration and combine that instance price with the number of instances in the group for the new configuration.

Figure 2:
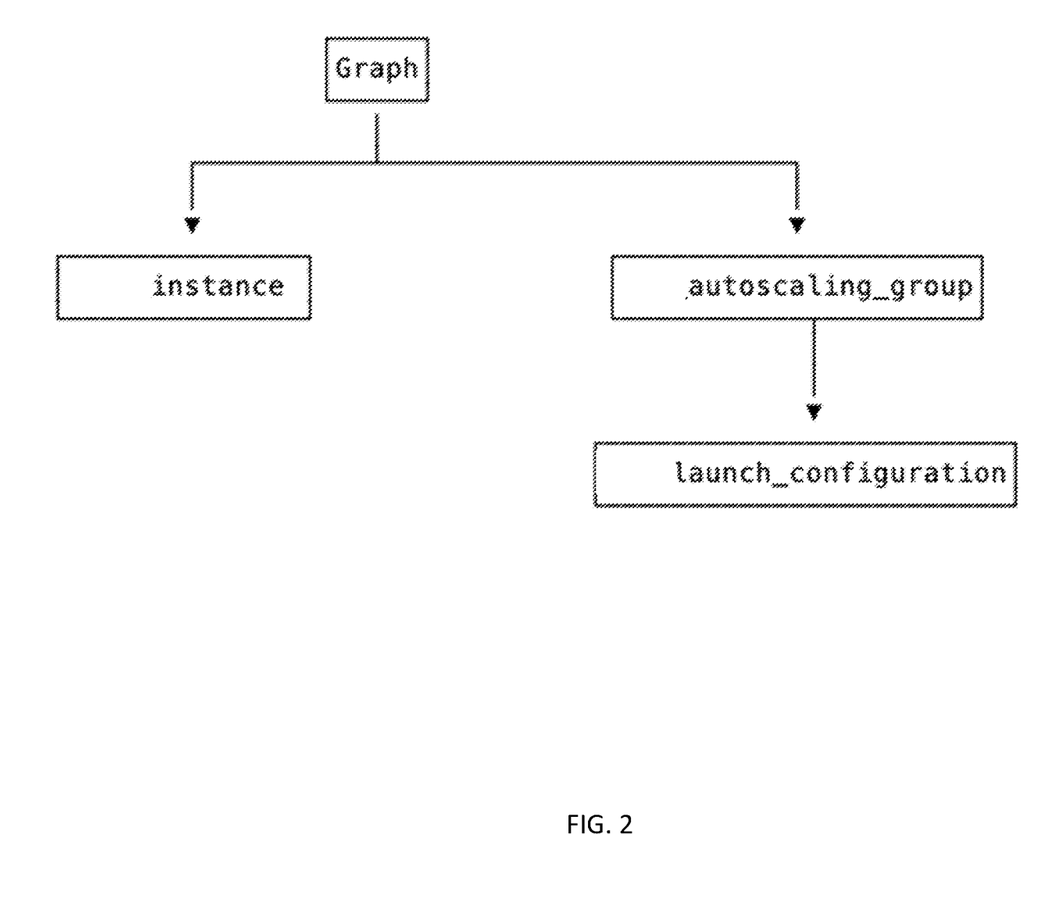
FIG. 2 illustrates a graph of priceable resources that can be created and used to register top level resources with the cost estimator framework.

To accommodate complexities such as autoscaling, the configuration is preferably modeled as a graph, with the group being a root level node pointing to the launch configuration. Prices can be mapped based at least in part on a semantic association between the launch configuration and the autoscaling group. FIG. 2 is a simplified example of such a graph. In some implementations, resources are defined as two types. The first type are top level resources, such as the ASG, which are mapped directly to cloud infrastructure resource types. The second type are subordinate resources, such as the launch configuration, which have no meaning on their own with respect to costs of the plan, and which must be resolved by other mechanisms. Price resolvers 112 construct the graph of priceable resources, and register the top level resources with the template.

Price resolvers 112 need not explicitly recognize every resource. In the general case, where resources can be fully identified using attributes and simple matching rules, the system will resolve these resources automatically, and add them to the graph. The flexibility of this graph exists for complex resource relations, as in the autoscaling group example above.

The system relies on input from a provisioning plan. Planning module 108 distinguishes between resource values before and after the changes are to be applied, and can represent them as such. Each of these representations of resource values can implement a values-representation type, enabling the system to estimate prices or costs for before and after a plan is applied. In some implementations, a public API by the cloud providers 103 of the framework is agnostic to any operation semantics of the plan file, and only operates on values-representations. The actual application code can instead be configured to determine when to price before and after values.

If not all dimensions for a price can be matched, a set of prices with one or more unbound dimensions will be provided. For example, for a cloud provider instance, if all dimensions except for instance type are matched, for example, a price for each instance type in a region can be obtained. Accordingly, an upper and lower bound for pricing can be generated, and the unmatched prices can be returned. This capability enables teams who manage their self-service infrastructure to view an estimate of changes in monthly cost from their cloud provider before applying any change.

In accordance with some implementations, the price estimator system 102 can include a policy module 114. The policy module 114 allows cost-centric policies to be created and then automatically enforced in the cloud-based infrastructure provisioning workflow. Administrators then have the ability via the policy module 114 to approve significant changes or to prevent specific workspaces from exceeding predetermined cost thresholds or policy limits.

For most teams, there is also a need to enforce policies on the type of infrastructure created, how it is used, and which teams get to use it. The policy module provides compliance and governance without requiring a shift in the overall team workflow.

The policy module 114 enables an organization to define policies that are enforced against infrastructure between the plan and apply phases of an infrastructure provisioning process. In some implementations, the policy module 114 is a policy-as-code framework in which the policies can be coded and stored in the cost estimator system 102. Compared to many tools that scan existing infrastructure for policy infractions, the policy module 114 proactively prevents provisioning of out-of-policy infrastructure and gives teams the confidence that all changes they deploy and within the organization's policy. The policy module 114 is configured to ensure that consistent financial governance is applied to infrastructure changes. For example, in some implementations, the policy module 114 can implement and enforce a quota system, whereby teams or groups can be assigned a maximum spend quota. Therefore, instead of developers waiting weeks or longer to provision infrastructure, which becomes a bottleneck for deployment, policy-as-code allows an organization to separate the definition of the policy from the execution of the policy.

By addressing provisioning costs from a more proactive standpoint, organizations can take an approach in which IT Ops researches problems that impact cost, collates and collects data to formalize policies and influence actions across all DevOps teams, and enables everyone in the organization to take consistent actions based on estimated infrastructure costs and company policy. Centralized teams codify policies enforcing security, compliance, and operational best practices across all cloud provisioning. Automated enforcement of policies ensures changes are in compliance without creating a manual review bottleneck.

The cost estimator system 102 can further include a deployment module 116 to apply approved changes or configurations, to create a new state of the cloud-based infrastructure according to changed resources per the plan. The results of these changes are sent by the deployment module 116 to the client computers 101 via the API 104.

Figure 3:
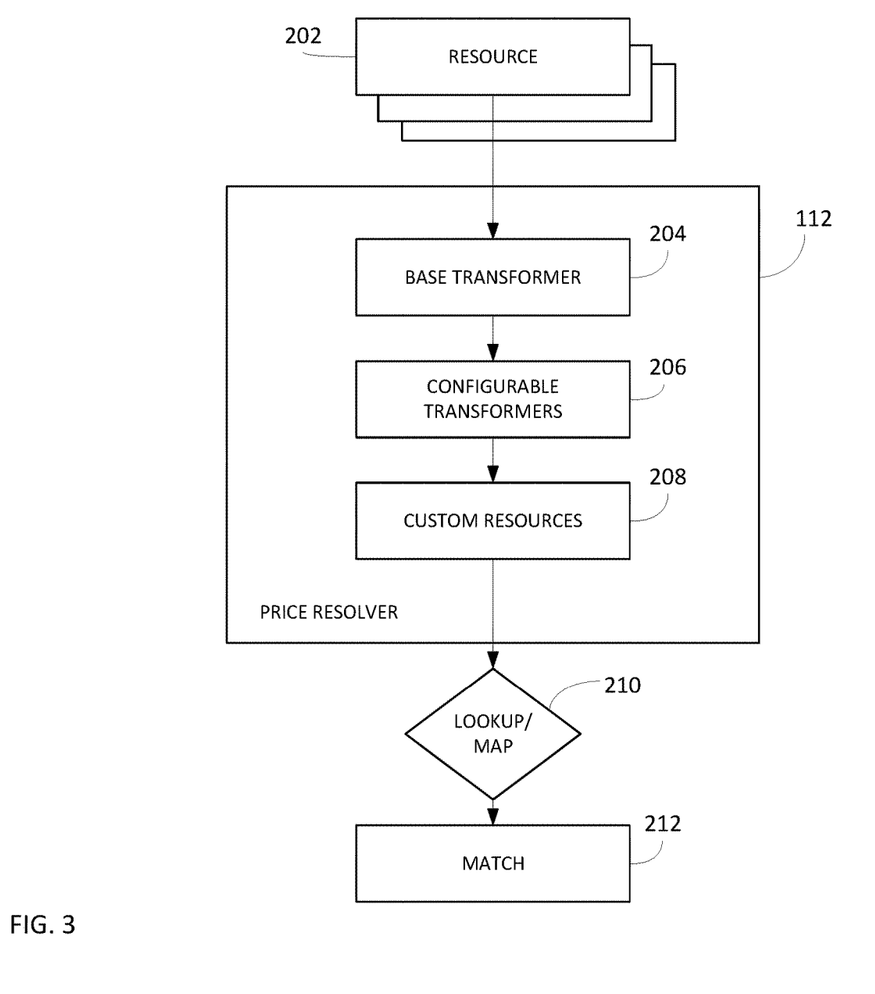
FIG. 3 illustrates a price resolver and transformation funnel executed by the price resolver, in accordance with implementations described herein.

FIG. 3 illustrates a price resolver 112. As described above, each resource can be defined by a stock-keeping unit (SKU). A SKU can have multiple prices, or terms. A SKU may have multiple terms to differentiate between different rates for a SKU (e.g., Reserved, vs. On-Demand instances). A SKU has a collection of attributes associated with it. For example, an AWS Instance SKU may have the following attributes, provided merely as examples: servicecode; location; locationtype; instancetype; currentGeneration; instanceFamily; physicalProcessor; clockSpeed; memory; storage; networkPerformance; processor Architecture; tenancy; operatingSystem; licenseModel; usagetype, capacitystatus; processorFeatures; servicename; or the like.

Prices are retrieved from the cloud provider API 103 by searching for one or more of these attribute/value pairs. Attributes used in the search are called search attributes. Not every attribute in the examples above are needed to resolve a price, and in most cases a minimal set is needed to retrieve a price for an instance of a resource. The task of each price resolver 112 is to generate enough search attributes to uniquely identify the price from the resource configuration, in a process known as a transformation in which information from the configuration is combined with information provided to the price resolver 112 by developers or other parties.

Accordingly a "resolver funnel" of transformations is provided by each price resolver 112, with those at the start being more generic, and those at the end being more specific. Each layer of the funnel may be composed of one or more processes responsible for transformation, called transformers. Each price resolver 112 executes a transformer to receive attributes from the configuration plan, called configuration attributes, and return search attributes.

In some implementations, each price resolver 112 includes a resource 202 as an input. The resource 202 can be specified by the configuration, plan, or other input from a developer or cloud provider. A base transformer 204 applies static rules, such as mapping an instance type to the specification used by the cloud provider (i.e. "instanceType"). One or more configurable transformers 206 can map, translate, and/or look up configurable attributes, such as transforming an attribute "us-west-1" to "US West (N. California)" for a proper and/or easier mapping. Finally, one or more custom resources 208 can be employed for generating configuration attributes from custom specifications by the cloud provider. A lookup/mapping module 210 then takes the transformed search attributes to the cloud service API to find a match for the requested resource of the proposed changes or configuration.

Figure 4:
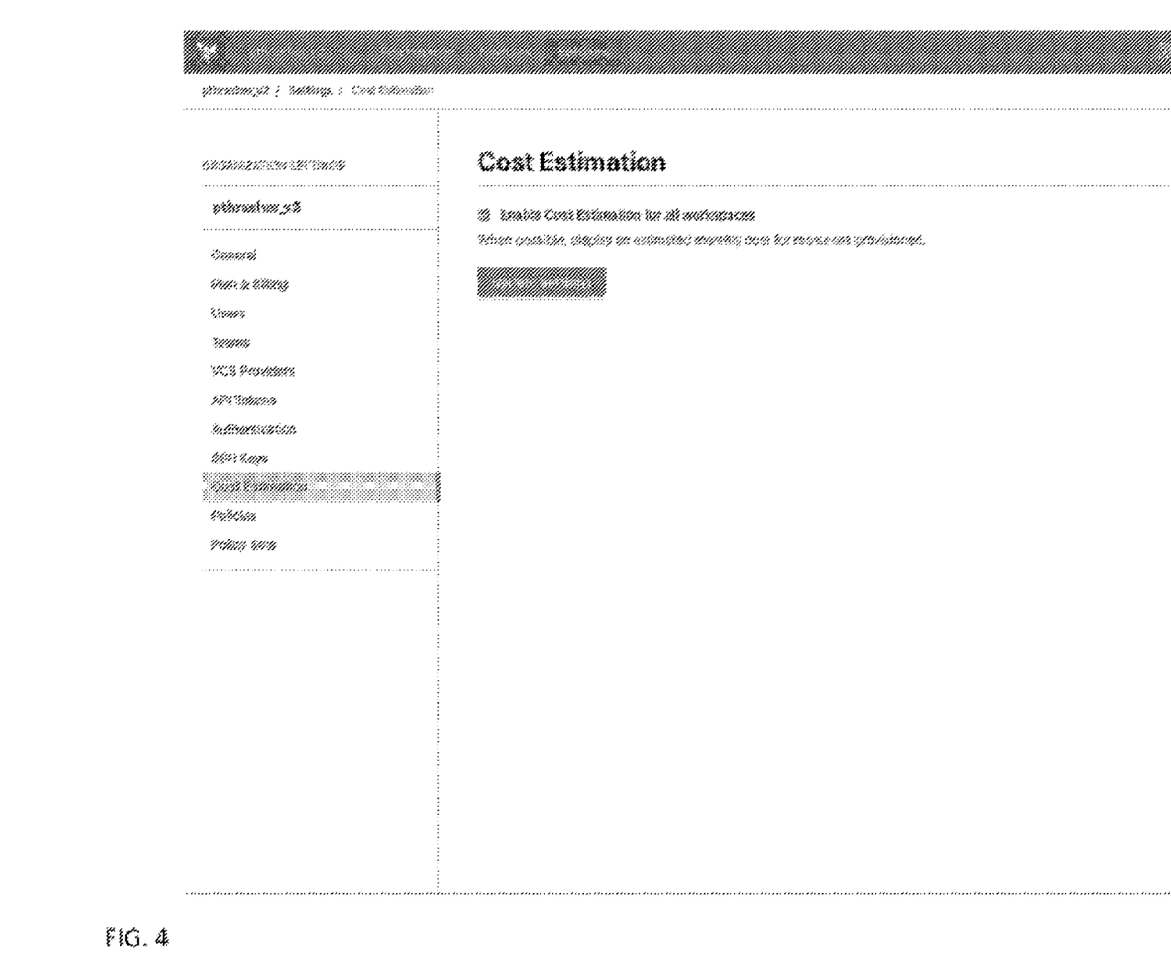
FIGS. 4-7 show various user interfaces that illustrate interactions with and/or outputs from the cost estimation system.
Figure 5:
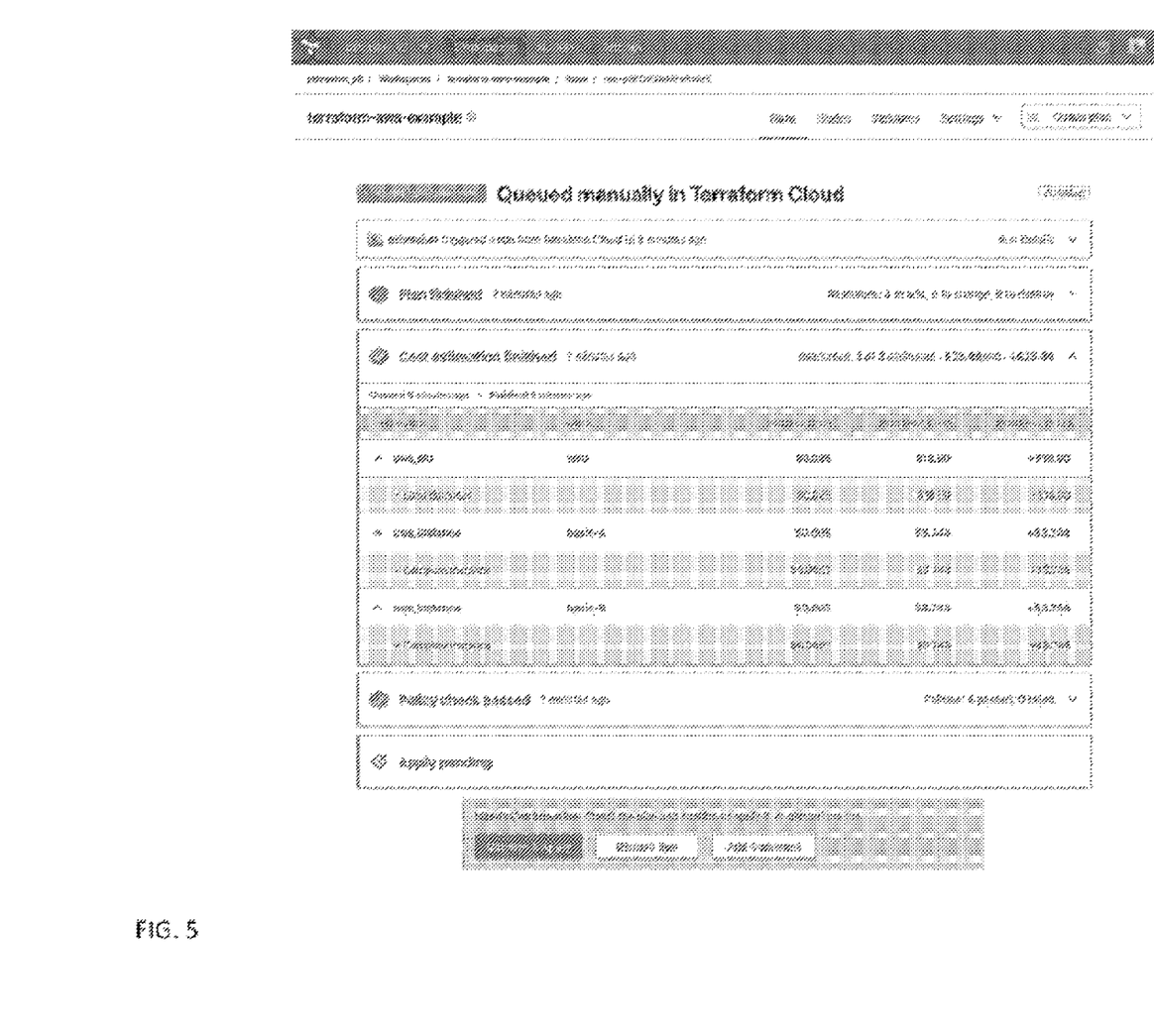

Accordingly, all teams using self-service cloud infrastructure provisioning system can now see an estimate of changes before they are applied by enabling cost estimation, such as via settings of their configuration plan or organization, as shown in FIG. 4. Once cost estimation is applied to an organization's infrastructure, all future changes or proposed changes to infrastructure will include an estimate of the updated total monthly cost for the resources that have changed, along with a separate estimate of the change in cost, as shown in FIG. 5.

Accordingly, practitioners applying a change can have before-the-fact visibility into the potential cost impact of a change. This makes it easier to identify simple mistakes in configuration that could have significant financial implications, to collaborate with other business units to keep costs aligned with forecasts, and to support early intervention and remediation workflows at the most cost effective and lowest risk time to adjust implementation.

Figure 6:
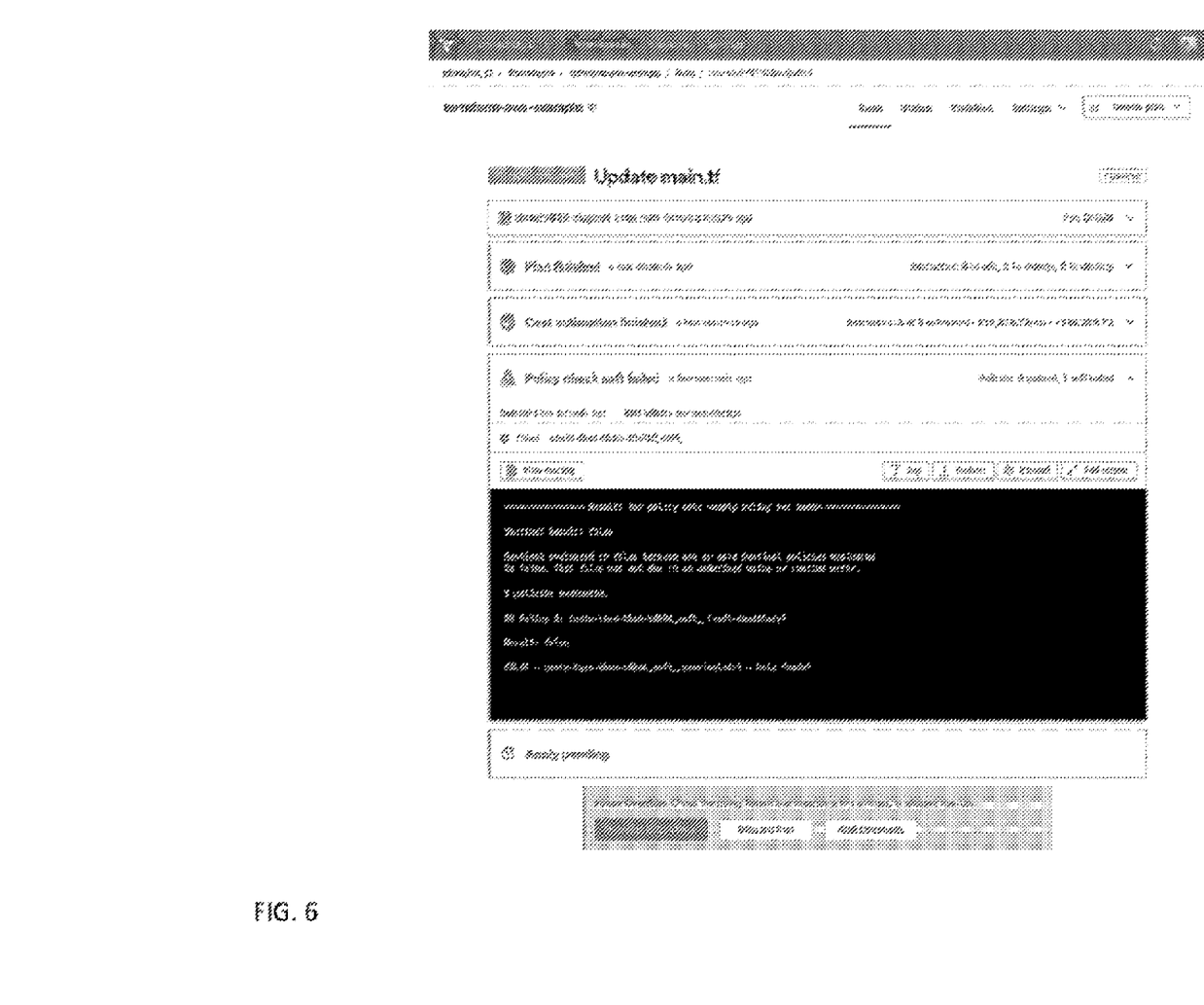

The policy-as-code approach that takes advantage of the cost estimation features so that organizations can now set guidelines on what is an acceptable change that requires review and then only escalate when a change is in breach of the standard policy. This frees up time in the approval workflow by ensuring that team is only required to review genuine escalations, and the practitioners responsible for implementation are able to self-service in-policy changes with confidence. FIG. 6 shows an example in which a provisioning run has breached a "soft" policy check.

There may also been known cost thresholds that should never be breached, and an automatic escalation into an approval workflow where a review would be unnecessary. An example could be preventing workspaces that are managing "development" environments from ever exceeding a maximum estimated monthly cost. With such a policy in place, developers have the freedom and confidence to experiment with any infrastructure configuration they desire without the risk of uncomfortable conversations later. It also expands their autonomy in self-service workflows as a breach in policy allows them to make pragmatic decisions about what infrastructure may be able to be de-provisioned to free additional budget for the new changes they wish to deploy.

Figure 7:
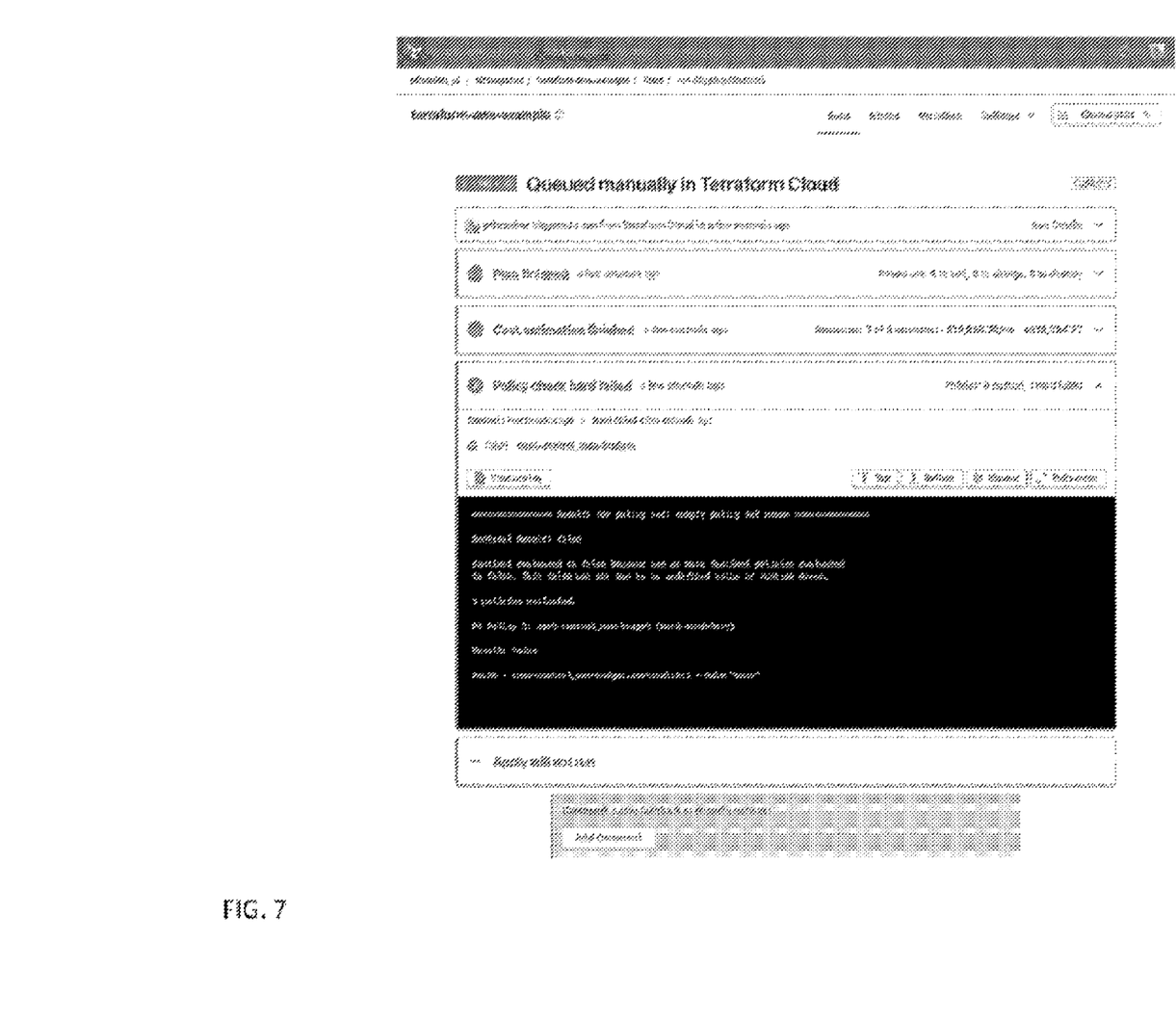

FIG. 7 illustrates an example of a provisioning run that has had a policy "hard" fail: The hard failure in this exemplary instance is the cost-control/max-budget policy, which has been defined to prevent the total estimated monthly cost from exceeding $10,000/mo.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on." above and in the claims is intended to mean, "based at least in part on." such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method comprising:
receiving, by a cost estimator system, a configuration having proposed changes for a cloud-based infrastructure, proposed changes to a plan of the cloud-based infrastructure, the plan comprising data representing one or more computing resources needed for a cloud-based application of the cloud-based infrastructure;
generating, by the cost estimator system, a new configuration for the cloud-based infrastructure, the new configuration incorporating the proposed change
determining, by a price resolver of the cost estimator system, resources that are part of the new configuration;
transforming, by the price resolver, generic resource attributes of the resources into provider-specific stock-keeping unit (SKU) identifiers using a resolver funnel of attribute transformations;
retrieving, by the price resolver, price data for the resolved resources by making an authenticated API call to each cloud provider's pricing endpoint using the provider-specific SKU identifiers; and
generating, by the cost estimator system based on the price data received by the price resolver, a cost estimate for the new configuration of the cloud-based, application of the cloud-based infrastructure.

2. The method in accordance with claim 1, further comprising transforming, by the price resolver, resource attributes to cloud provider-specific attributes to map one or more resources to a stock keeping unit price provided by a cloud provider.

3. The method in accordance with claim 1, further comprising determining, by a policy module that stores at least one cost policy for the cloud-based infrastructure, whether the cost estimate for the new configuration is in accordance with the at least one cost policy.

4. The method in accordance with claim 3, where the at least one cost policy stored by the policy module includes a spend quota for one or more teams using the cloud-based infrastructure.

5. The method in accordance with claim 4, wherein determining whether the cost estimate for the new configuration is in accordance with the at least one cost policy includes calculating a cost of a current configuration of the cloud-based infrastructure and the cost estimate for the new configuration of the cloud-based infrastructure.

6. The method in accordance with claim 1, further comprising delivering, by a computer communication interface associated with the cost estimator system, the cost estimate in an electronic form to one or more client computers connected with the computer communication interface.

7. The method of claim 1, further comprising:
storing, by a policy module, a spend-quota policy associated with a team identifier for the cloud-based infrastructure;
automatically comparing, by the policy module, the cost estimate for the new configuration and a cost of a current configuration of the cloud-based infrastructure to the spend-quota policy for the team; and
generating, by the policy module, a compliance decision indicating whether the cost estimate for the new configuration satisfies the spend-quota policy for the team.

8. A computer program product for estimating a cost for cloud based infrastructure, the computer program product comprising a non-transitory machine-readable medium storing instructions that, when executed by at least one programmable processor, cause the at least one programmable processor to perform operations comprising: receive a configuration having proposed changes for a cloud-based infrastructure, the proposed changes to a plan of the cloud-based infrastructure, the plan comprising data representing one or more computing resources needed for a cloud-based application of the cloud-based infrastructure; generate a new configuration for the cloud-based infrastructure, the new configuration incorporating the proposed changes; determine resources that are part of the new configuration; transform generic resource attributes of the resources into provider-specific stock-keeping unit (SKU) identifiers using a resolver funnel of attribute transformations; retrieve price data for the resolved resources by making an authenticated API call to each cloud provider's pricing endpoint using the provider-specific SKU identifiers; and generating a cost estimate for the new configuration of the cloud-based infrastructure.

9. The computer program product in accordance with claim 8, wherein the operations further comprise an operation to determine, based on at least one cost policy for the cloud-based infrastructure, whether the cost estimate for the new configuration is in accordance with the at least one cost policy.

10. The computer program product in accordance with claim 9, where the at least one cost policy stored by the policy module includes a spend quota for one or more teams using the cloud-based infrastructure.

11. The computer program product in accordance with claim 10, wherein determining whether the cost estimate for the new configuration is in accordance with the at least one cost policy includes an operation to calculate a cost of a current configuration of the cloud-based infrastructure and the cost estimate for the new configuration of the cloud-based infrastructure.

12. The computer program product in accordance with claim 8, wherein the operations further comprise operations to format and deliver, by a computer communication interface, the cost estimate in an electronic format to one or more client computers connected with the computer communication interface.

* * * * *